UNITED STATES PATENT OFFICE 2,512,596

PRODUCTION OF ALKENYL THIOPHENES

Philip M. Arnold, Bartlesville, Okla., assignor to Phillips Petroleum Company, a corporation of Delaware No Drawing. Application August 1, 1946, Serial No. 687,702

13 Claims. (Cl. 260—329)

The present invention relates to the production of alkenyl thiophenes. In one of its more specific aspects the present invention relates to the production of alkenyl thiophenes by the reaction of an alkyl thiophene with formaldehyde. The process of the present invention is particularly useful for the production of 2-vinylthiophene from thiotolene and formaldehyde.

Alkenyl thiophenes have many potential uses in the chemical industry and would find wide application if readily available. 2-vinylthiophene in particular is potentially valuable as a comonomer in the polymerization of vinyl compounds for the production of synthetic rubber. The extensive use of 2-vinylthiophene for the production of high molecular weight polymers of a rubbery or resinous nature depends to a large extent upon the quantity production of vinylthiophene by an efficient and economical process. Vinylthiophenes have other potential uses, particularly as intermediates in the production of sulfur-containing chemicals, and other uses which will be apparent to those skilled in the art.

The process of the present invention provides a means for the large scale production of alkenyl thiophenes efficiently and economically. In accordance with this invention an alkyl thiophene is reacted with formaldehyde under controlled reaction conditions to produce alkenyl thiophenes. For the production of 2-vinylthiophene, thiotolene (2-methylthiophene) is reacted with formaldehyde. Monomethylol-2-thiotolene is also produced by the reaction of formaldehyde with 2-methylthiophene in accordance with this invention and may, if desired, be recovered as one of the products of the process. The process is preferably conducted in a continuous manner as hereinafter more fully described. The conversion of alkyl thiophenes to alkenyl thiophenes is effected in the presence of a catalyst, preferably in a single step. Alkenyl thiophenes have been previously prepared by various methods and are recorded in the literature. These include 2-vinylthiophene, 2-allylthiophene, 2-(alpha-ethylpropenyl)-thiophene, and 2-isopropenylthiophene. 2-vinylthiophene has been prepared by heating 2-thienylmethylcarbinol in the presence of a small amount of hydroquinone. 2-allylthiophene has been prepared by the treatment of the magnesium compound of alpha-iodothiophene with allyl bromide in ether. 2-(alpha-ethylpropenyl)-thiophene has been prepared by heating diethyl-alpha-thienylcarbinol with anhydrous oxalic acid. 2-isopropenylthiophene has been prepared by the reaction of alpha-thienyl magnesium iodide with acetone in absolute ether. Alkenyl thiophenes may be prepared by a much more economical and direct method in accordance with the present invention.

An object of the present invention is to provide an improved process for the production of alkenyl thiophenes. A further object of the present invention is to provide a process for the production of alkenyl thiophenes from alkyl thiophenes and formaldehyde. Another object of the present invention is to provide an improved process for the production of 2-vinylthiophene and its homologs. It is another object of the present invention to provide a continuous process for the production of alkenyl thiophenes from alkyl thiophenes and formaldehyde by the simultaneous condensation of the alkyl thiophenes with formaldehyde and dehydration to produce alkenyl thiopenes. Other objects and advantages of the invention, some of which are referred to specifically hereinafter, will be apparent to those skilled in the art to which the invention pertains.

The production of alkenyl thiophenes by the interaction of alkyl thiophenes and formaldehyde involves two reactions, the addition of formaldehyde to an alkyl thiophene to form the corresponding monomethylol derivative of the alkyl thiophene and dehydration of the monomethylol derivative of the alkyl thiophene to the alkenyl thiophene. In the production of 2-vinylthiophene by this method the reactions involved are represented by the following equations:

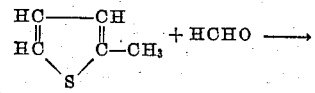

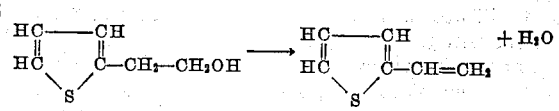

Homologs of vinyl thiophene, e. g., alkyl substituted vinyl thiophenes, may be produced in a similar manner. As an example, 2-methyl-5-ethylthiophene may be converted to 2-vinyl-5-ethylthiophene by formation of the monomethylol derivative and subsequent dehydration to 2-vinyl-5-ethylthiophene. Other homologs of vinyl thiophene may be produced in an analogous manner.

The present invention provides an improved process for the production of vinyl thiophene, its homologs and derivatives from an alkyl thiophene containing the alkyl group attached to a carbon atom in the thiophene nucleus in the 2-position, as exemplified by the foregoing reactions. Thiophene derivatives employed in and produced by the process may also contain chloro or cyano substituents, or both, attached to a carbon atom in the thiophene nucleus. The present invention is particularly applicable to the production of 2-vinylthiophene from 2-methylthiophene and formaldehyde. The intermediate monomethylol derivative of the alkyl thiophene may be separately recovered, if desired, and dehydrated to the alkenyl thiophene in a separate step or recycled to the reaction together with the alkyl thiophene and formaldehyde feed.

The present invention provides a novel process for the production of alkenyl thiophenes. While various alkyl thiophenes containing an alkyl group attached to a carbon atom in the 2-position and referred to herein as 2-alkyl thiophenes, may be employed as starting materials for the present process, the preferred alkyl thiophenes are those having an alkyl group containing from 1 to 6 carbon atoms attached to a carbon atom in the 2-position in the thiophene nucleus to produce the corresponding alkenyl thiophenes having one additional carbon atom in the alkenyl group. My novel process is carried out in the vapor phase in the presence of catalysts which are particularly effective for this reaction. By the process of my invention new alkenyl thiophenes and their derivatives may be produced. The process is adapted to smooth, continuous operation without substantial interference from polymeric by-products.

In accordance with the present invention the alkyl thiophene is admixed with formaldehyde and passed in vapor phase at an elevated temperature into contact with a catalyst. The molecular proportions of formaldehyde and alkyl thiophene are preferably within the range of from about 0.5 to about 1 mol of formaldehyde per mol of alkyl thiophene. The effluent comprises the alkenyl thiophene, unchanged reactants, and the monomethylol alkyl thiophene intermediate. The effluent is subjected to fractional distillation to effect the separation of the product from the other components of the mixture.

The formaldehyde may be either in anhydrous form or in an aqueous solution. Dilute aqueous solutions of formaldehyde, such as the 37 per cent solution of commerce, are suitable for use in the process of the present invention. Formaldehyde used for this reaction may be added in an aqueous solution, as paraformaldehyde, or as trioxane with equally good results. When paraformaldehyde is used, water may be added to facilitate separation of unchanged reactants for recycling.

The preferred catalysts for use in the process of the present invention are relatively non-volatile strong mineral acids (i. e. sulfuric acid and phosphoric acid), anhydrides of these acids, and acid reacting salts of these acids. Phosphoric acid, sulfuric acid, and potassium persulfate are particularly effective. Preferably the relatively non-volatile strong mineral acid, anhydride, or acid reacting salt is supported on a dehydrating metal oxide. The dehydrating metal oxides comprise alumina, bauxite, silica gel, silica-alumina gel and other mixed oxides of silicon and aluminum, such as fuller's earth, attapulgus clay, Floridin earth, and the like. Other dehydrating metal oxides may be used, e. g., oxides of thorium, tungsten, vanadium and molybdenum but are not generally commercially economical. The catalyst may be prepared by impregnating the dehydrating metal oxide, preferably in granular or pellet form, with a solution of the acid component, i. e., the relatively non-volatile strong mineral acid, anhydride of a relatively non-volatile strong mineral acid or an acid reacting salt. The acid component of the catalyst has an affinity for water and is consequently present on the carrier in an aqueous solution during operation. The concentration of the aqueous solution of the acid component may be controlled by control of the quantity of water vapor in the feed stream. The preferred range of concentration for sulfuric acid is 80 to 100 per cent and for phosphoric acid 60 to 100 per cent. Acid concentrations of 85 per cent orthophosphoric and 95 per cent sulfuric are especially suited to the present process. Anhydrides of these acids, e. g., phosphorous pentoxide and sulfur trioxide, and alkali metal strong acid reacting salts of these acids, particularly sodium dihydrogen phosphate and potassium persulfate are effective catalysts for the reaction. The anhydrides are rapidly diluted with water due to the dehydration reaction. Boron trifluoride and alkali fluoborates, e. g., sodium fluoborate and potassium fluoborate are also effective catalysts for the reaction. While the reaction will proceed to some extent in the absence of a catalyst, the above-mentioned catalysts give definitely higher yields of the desired product than do non-catalyzed operations. Orthophosphoric acid and potassium persulfate are selective in their actions and make possible higher ultimate yields. Pellets of alumina, about 1/8 inch in diameter and 1/8 inch long, and granular silica-alumina gel are preferred as the dehydrating metal oxide carriers.

Temperatures employed for the process are in general within the range of from about 200 to about 800° F., preferably from about 300 to about 600° F. Pressure requirements are not critical. Satisfactory results are obtained in the range of from about atmospheric pressure to about 100 pounds per square inch. Yields of alkenyl thiophenes within the range of 10 to 20 per cent per pass based on the alkyl thiophene charged may be obtained.

In a specific example of the operation of the process of this invention thiotolene (2-methylthiophene) is admixed with formaldehyde in the ratio of about 3 mols of formaldehyde to 5 mols of thiotolene and the mixture preheated to a temperature within the range of from about 400 to about 450° F. The mixture, at a pressure of about 30 pounds per square inch gage, is passed into contact with a catalyst comprising about 5 weight per cent orthophosphoric acid supported on granular silica-alumina gel. The effluent of the catalyst is condensed and separated by fractional distillation into a product stream of substantially pure 2-vinylthiophene and a recycle stream comprising unchanged reactants and monomethylol-2-thiotolene.

From the foregoing, it is believed that the many advantages obtainable from the practice of the present invention will be readily apparent to persons skilled in the art. However, since certain changes may be made in carrying out the above method without departing from the scope of the invention, as defined by the appended claims, it is intended that all matter contained herein shall be interpreted as illustrative and explanatory, rather than in a limiting sense.

I claim:

1. A process for the production of an alkenyl thiophene which comprises reacting a 2-alkyl thiophene selected from the group consisting of unsubstituted 2-alkyl thiophenes, alkyl substituted 2-alkyl thiophenes, chloro substituted 2-alkyl thiophenes and cyano substituted 2-alkyl thiophenes wherein the substitution is on a nuclear carbon atom, with formaldehyde at a temperature within the range of from 200° F. to 800° F. and in the vapor phase in the presence of a catalyst comprising an acid component selected from the group consisting of relatively non-volatile strong mineral acids, anhydrides of said acids, and acid reacting salts of said acids.

2. A process as defined in claim 1 wherein said alkyl thiophene is 2-methylthiophene.

3. A process for the production of an alkenyl thiophene which comprises reacting a 2-alkyl thiophene selected from the the group consisting of unsubstituted 2-alkyl thiophenes, alkyl substituted 2-alkyl thiophenes, chloro substituted 2-alkyl thiophenes and cyano substituted 2-alkyl thiophenes wherein the substitution is on a nuclear carbon atom, with formaldehyde at a temperature within the range of from 200° F. to 800° F. and in the vapor phase in the presence of a catalyst comprising a relatively non-volatile strong mineral acid.

4. A process as defined in claim 3 wherein said acid is orthophosphoric acid.

5. A process for the production of 2-vinylthiophene which comprises reacting 2-methylthiophene with formaldehyde at a temperature within the range of from 200° F. to 800° F. and in the vapor phase in the presence of phosphoric acid as a catalyst.

6. The process which comprises the interaction of a 2-alkyl thiophene selected from the group consisting of unsubstituted 2-alkyl thiophenes, alkyl substituted 2-alkyl thiophenes, chloro substituted 2-alkl thiophenes and cyano substituted 2-alkyl thiophenes wherein the substitution is on a nuclear carbon atom, said 2-alkyl thiophene containing from 1 to 6 carbon atoms in the alkyl group, and formaldehyde at a temperature within the range of from 200 to 800° F. and in the vapor phase.

7. The process which comprises the interaction of 2-methylthiophene with formaldehyde at a temperature within the range of from 200° F. to 800° F. and in the vapor phase in the presence of a relatively non-volatile strong mineral acid.

8. A process for the production of 2-vinylthiophene which comprises reacting 2-methylthiophene with formaldehyde at a temperature of from 200 to 800° F. and in the vapor phase in the presence of a catalyst comprising a minor proportion of phosphoric acid deposited on a solid granular dehydrating oxide.

9. A process for the production of 2-vinylthiophene which comprises forming a mixture of formaldehyde and 2-methylthiophene, passing said mixture in the vapor phase into contact with a catalyst comprising a minor proportion of phosphoric acid supported on silica-alumina gel at a temperature within the range of from 300° to 600° F.

10. The process which comprises the interaction of a 2-alkyl thiophene selected from the group consisting of unsubstituted 2-alkyl thiophenes, alkyl substituted 2-alkyl thiophenes, chloro substituted 2-alkyl thiophenes and cyano substituted 2-alkyl thiophenes wherein the substitution is on a nuclear carbon atom, said 2-alkyl thiophene containing from 1 to 6 carbon atoms in the alkyl group, and formaldehyde at a temperature within the range of from 200 to 800° F. and in the vapor phase in the presence of a catalyst comprising boron trifluoride.

11. A process as defined in claim 6 wherein there are employed temperatures within the range of from 300° F. to 600° F., and mol ratios of formaldehyde to 2-alkyl thiophene within the range of from 0.5:1 to 1:1.

12. A process as defined in claim 1 wherein said 2-alkyl thiophene contains from 1 to 6 carbon atoms in the 2-alkyl group, and wherein there are employed temperatures within the range of from 300° F. to 600° F., and mol ratios of formaldehyde to 2-alkyl thiophene within the range of from 0.5:1 to 1:1.

13. The process which comprises the interaction of a 2-alkyl thiophene selected from the group consisting of unsubstituted 2-alkyl thiophenes, alkyl substituted 2-alkyl thiophenes, chloro substituted 2-alkyl thiophenes and cyano substituted 2-alkyl thiophenes wherein the substitution is on a nuclear carbon atom, said 2-alkyl thiophene containing from 1 to 6 carbon atoms in the alkyl group, and formaldehyde at a temperature within the range of from 200 to 800° F. and in the vapor phase in the presence of a catalyst comprising an alkali fluoborate.

PHILIP M. ARNOLD.

REFERENCES CITED

The following references are of record in the file of this patent:

J. Soc. Chem. Ind. 49, 245.51 T (1930).